C. G. PATTERSON.
FILTER FOR METALLURGICAL AND OTHER PURPOSES.
APPLICATION FILED SEPT. 22, 1908.
946,862.
Patented Jan. 18, 1910.
2 SHEETS—SHEET 1.
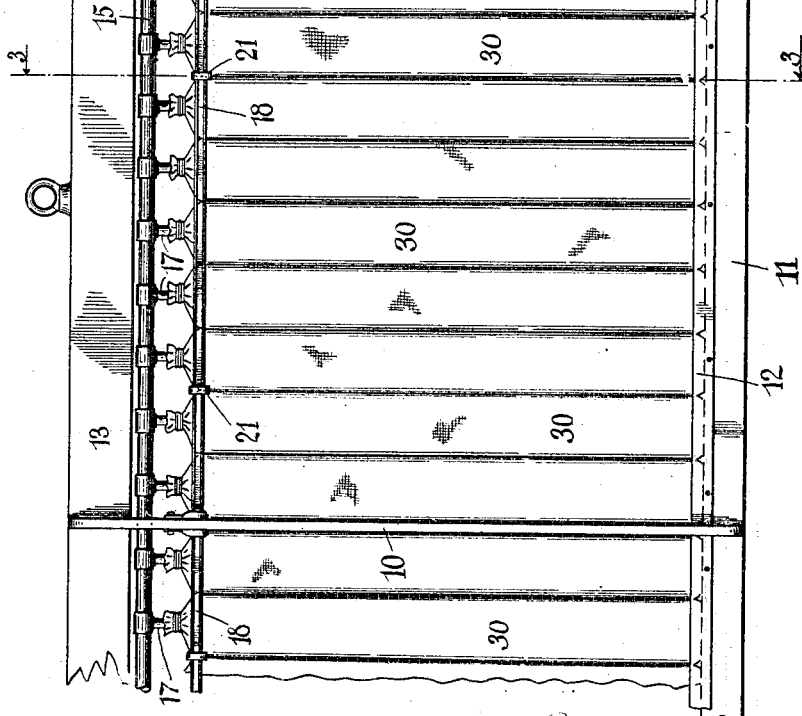

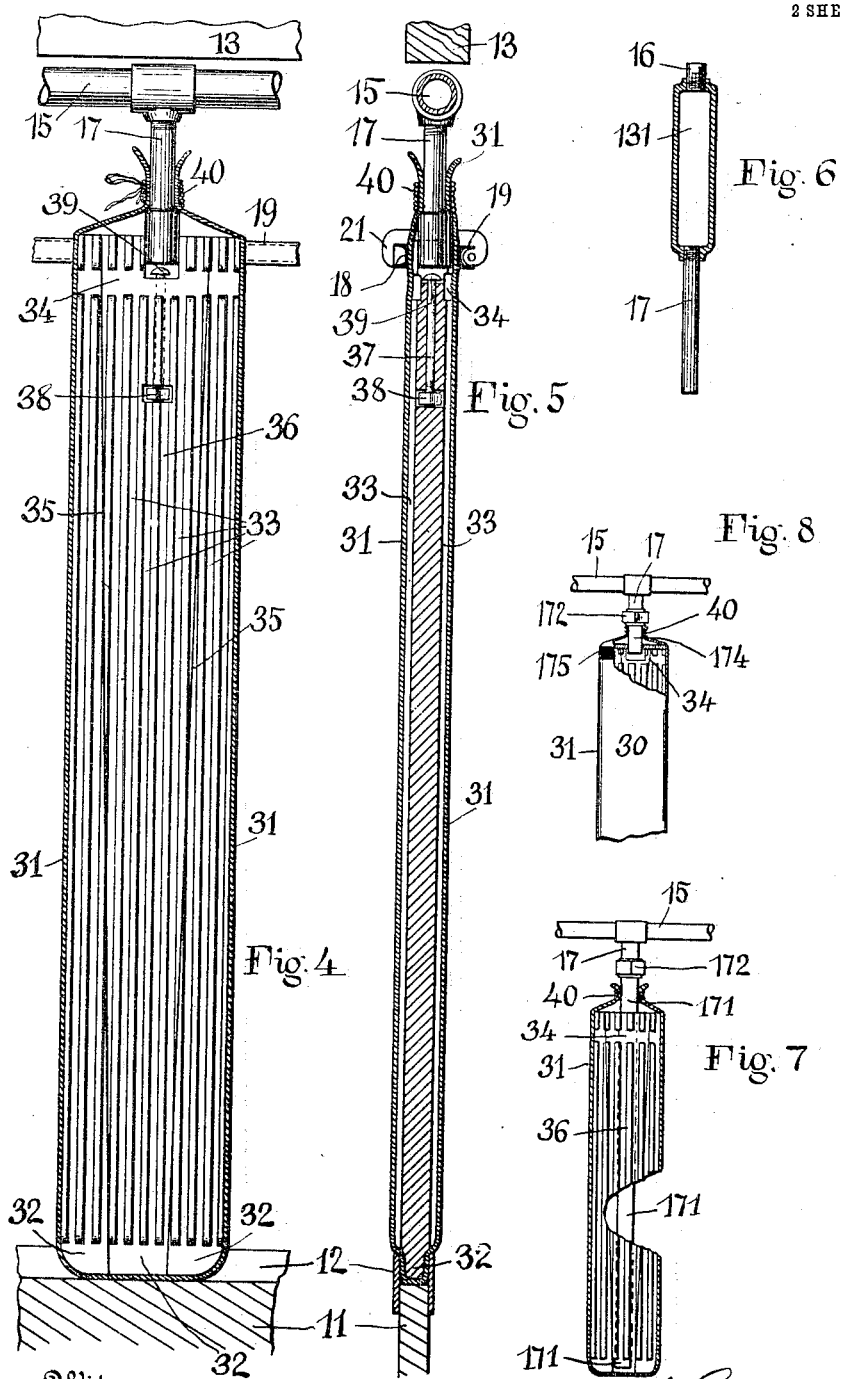

UNITED STATES PATENT OFFICE.

CLARENCE G. PATTERSON, OF BERKELEY, CALIFORNIA, ASSIGNOR TO THE BUTTERS PATENT VACUUM FILTER COMPANY, INCORPORATED, A CORPORATION OF NEVADA.

FILTER FOR METALLURGICAL AND OTHER PURPOSES.

946,862.  Specification of Letters Patent.  Patented Jan. 18, 1910.

Application filed September 22, 1908. Serial No. 454,230.

*To all whom it may concern:*

Be it known that I, CLARENCE G. PATTERSON, a citizen of the United States, and a resident of Berkeley, California, have invented certain new and useful Improvements in Filters for Metallurgical and other Uses, of which the following is a specification.

The improved filter was primarily designed for use in the cyanid process for treating ores and is particularly desirable for filtering slimy ores or slime of a nature that tends to clog the filter after a layer of considerable thickness has been formed upon the filtering surface. It has long been the practice to separate the value-bearing solution from the pulp by means of filters and after impoverishing the precipitate by washing it with weaker solution or clear water to remove and discard the filtrate on the dump heap and to treat the value-bearing solution for the recovery of the values contained in them.

The present improvement is particularly adapted for such practice and provides quick and ready access for the purpose of cleaning both sides of the filtering cloth or medium, or for repairs. It also provides for the ready discharge of the layer of precipitate when the same has accumulated to such a thickness as to make further filtration undesirable before the filter is freed from it. It allows the layer of precipitate to be discharged by a reverse current of air, if desired, instead of water, through the filtering medium, and it provides for the interchange, repair, or renewal of relatively small portions of a filter leaf without disturbing the other portions. Other valuable features of the invention will be readily appreciated from the following description.

In the drawings I have illustrated the improved filter in the best form at present known to me, but I of course wish to be protected in the various features of the improvement. It will be understood that many features can be used separately or in combination with others and can be present in widely differing forms from those which I illustrate.

Figure 1 is a face view of a filter leaf broken off at one end, as its length is immaterial. Fig. 2 is an end view of three such filter leaves placed together in proper working relation. Fig. 3 is a cross-section of Fig. 1 on the section plane 3—3. Fig. 4 is a detail view in section through the filter bag to show the details of construction of one of the units or members of the composite filter leaf of Fig. 1. Fig. 5 is a central longitudinal section of the same. Fig. 6 is a detail cross-section of the upper member of a modification of the filter leaf frame. Fig. 7 is a reduced size illustration of a modification of the educting connections of the filter members or units. Fig. 8 is a view of a modification of the coupling connections of the filter units or members.

Under my preferred construction a large number of filter leaves such as are illustrated in Fig. 1 may be placed side by side close together, as in Fig. 2, and suspended in a suitable filter tank by the projecting ends of the horizontal top member of each. Each full size working leaf or frame may contain twenty separate filter bags or filter units, all of which can be separately and quickly detached from the frame and from each other for repairs or very thorough cleaning when desired. The frame illustrated in Figs. 1, 2, and 3 comprises two panels formed by three vertical uprights or members 10, five inches wide by one inch thick, a horizontal bottom member 11 preferably about an inch and a half thick and set on edge, as illustrated, and provided with strips of non-corrosive metal secured on either side as at 12 to form a groove for receiving and alining the lower ends of the filter bags or units; a stout horizontal header 13 secured to the upper ends of the uprights 10, as shown, and projecting at each end as at 14 in order that the filter frame may be hung thereby upon the side walls of the tank, of appropriate size; a horizontal header pipe 15 extending lengthwise beneath the wooden header member 13 and provided with one or more outlets or main connections 16 for connection preferably with a partial vacuum so as to apply suction to the interior of the filter members and with as many depending suction tubes 17 as there are separate filter bags or units; and guide bars 18, 19, of suitable non-corrosive metal secured in position to hold the filter bags or units in alinement in the frame at their upper ends. The buide bars 18 on one side of the frames are hinged as at 20 to swing outward and upward clear of the bags, so the bags may be conveniently taken out, and clamping hooks 21 preferably pivoted to the fixed guide bars 19 provided at suitable intervals to hold the guide bars 18 in their closed position, or to release them at will.

The filter leaf may be divided into several panels by intermediate uprights 10. When several of the filter frames have been hung in the tank the edges of the uprights 10 come together, as shown in Fig. 2, and hold the opposed filtering surfaces separated by an interval of a few inches, sufficient to allow the filter cakes of precipitate to be formed on the respective faces of each frame or leaf without interference from the adjacent leaf.

The individual filter units 30, ten of which constitute a single panel of the leaf shown in Fig. 1, consist primarily of a bag of canvas or other suitable filtering material tightly stretched upon an inner form of wood having preferably the following construction. The width of each center is sufficient, allowing for the thickness of the canvas, to make one-tenth of the panel of the filter leaf. At its lower end it is rabbeted to form a tongue 32 which, with the canvas bag, is received in and registers with the groove formed between the metal strips 12 of the filter frame. The front and rear faces of the form or center are grooved vertically to form vertical channels, as at 33, for the filtrate, and are provided with horizontal cross-channels 34 which lie partly below the level of the guide bars 18, 19 and partly underlie those guide bars. Depending pipe connections 17 extend down somewhat lower than the top of these forms or centers loosely fitting a recess at the top of the same, as seen in Figs. 4 and 5. Each of the wooden forms is divided by slightly oblique longitudinal cuts 35 into a central wedge-shaped member 36 and two lateral members which fit such wedge. The wedge member is preferably provided with a bolt 37 secured by a nut 38 and the head of which, 39, projects slightly into the recess at the upper end of the form so that it can be made use of for taking hold of the wedge piece by a suitable means and drawing it out forcibly from between the two side pieces of the form when it is desired to remove the form from the interior of the bags, the fabric of which is shown at 31 in cross section in Figs. 4 and 5. The bags tightly fit the forms and at their upper end when in place in—a filter frame they are drawn tightly around the respective pipes 17 and wrapped tightly thereto by means of strong cords 40 which are then tied.

It will be understood that the filter bags and their contained wooden forms are separately and severally removable from the filter leaf. This is done by unwrapping the cord 40, opening the mouth of the bag so as to enable it to clear the lower end of the pipe 17, then swinging the bar 18 up out of the way and bringing the upper end of the filter bag and its wooden form forward so as to clear the pipe 17 and the bar 18, after which the filter bag may be raised, drawing the tongue 32 clear of the lower member of the filter frame. The wedge 36 may be then drawn out of the bag, applying force by means of the head 39 if necessary, and then the side members of the form may be drawn out and the bag thoroughly cleaned or repaired or a new bag substituted. In assembling, the side members of the form are first put in the bag and then the middle or wedge piece 36 is thrust into place, expanding the side pieces and the bag and making preferably a very tight fit of the bag upon the inclosed form. Preferably the cord 40 is run through a hem at the upper end of the bag, as a drawing string. When, therefore, the lower end of the form has been put in place between the strips 12 and the upper end brought into alinement with the pipe 17, the string 40 is drawn tight and wrapped around the neck of the bag so as to close the bag around the pipe 17, as shown in Figs. 4 and 5. When all the members of the panel are in place, the bar 18 is returned to its normal position and clamped by the clamp hooks 21, as seen in Fig. 5. When such a filter leaf is put in the tank, the bath should preferably rise to a point slightly above the wrapping 40. In the first use of the bag after it has been first put in place or has been thoroughly cleaned inside and out, the slimes depositing on its exterior when the suction is applied to its interior through the pipe 17, substantially and eventually completely incases and seals the portions of the bag above the bars 18 and 19 because this portion of the slimes upon the bag may remain intact and undisturbed while the filter is used very many times, being cleansed by merely discharging the deposit from the lower portions of the filter with the aid of a reverse current of air or water preferably introduced under pressure inside of the bag. During suction and while the filter is immersed in the bath the filtrate passing through the canvas and along the grooves 33 through the cross-grooves 34 finds its way to the educting pipe 17 and the suction is communicated with substantial uniformity to the whole active surface of the filter. When a deposit of the maximum permissible or desired thickness has been formed on the two faces of the filter leaf and preferably impoverished and washed, the entire deposit or cake covering the face of the panel, one on each side below the bars 18 and 19, may be loosened and dropped off in its entirety by introducting pressure into the interior of the filter. A cross-groove 34 lying directly under the comparatively sharp edge of the bar 18 or 19 insures the cracking and rupture of the cake of deposit sharply and substantially evenly along the lower edge of the bar while the almost simultaneous transmission of the pressure throughout the longitudinal grooves 33 loosens the cake in its entirety. Preferably the rabbeting which forms the tongue at 32 is carried somewhat higher than the upper edge of the bars 12 so as to form a cross-groove which will act similarly to the groove 34 and facilitate the clean release of the lower edge of the cake at the bars or strips 12. After the discharge of the cake the filter may be used again any number of times without disturbing the deposit which is formed upon and virtually seals the upper portion of the bag over the bars 18 and 19, thus obviating the need of rendering these portions of the filter impervious.

The ten filter bags or filter units that form a single panel lie closely together, as seen in Fig. 1, and their faces lying all in the same plane constitute in effect a single strong and very even filtering surface throughout which the filtering suction is very evenly applied.

In the modification shown in Fig. 6 a rectangular tubular metallic header member 131 is shown which may be substituted for the combined wooden header 13 and suction tube 15. The tubes 17 for connecting with the respective filter bags may be directly tapped into the bottom of this and the main suction connection 16 may be tapped into it at the top. The ends of course will be closed, as must of course also be the ends of the header pipe 15.

For use where for any reason engineers prefer to have the filtrate drawn from the bottom of the filter instead of the top, the educting tube is extended all the way down through the middle or wedge member 36 to form, as seen at 171 (Fig. 7,) an opening into the rabbeted portion at the bottom of the form. In this case it is necessary to have a union connection 172 between the pipe 171 and the pipe 17, or some flexible and tight connection, so as to allow the removal of the filter unit and so also as to insure the suction being applied first at the bottom of the form and not at the top.

In Fig. 8 a further modification is shown in which a short pipe connection 174 provided with a shoulder that is secured or screwed to the top of the wooden form is employed and the union connection 172 used both to make fluid connection with the pipe 17 and as a means of holding the form in place. Under such conditions and also when as described in connection with Fig. 7, the bars 18 and 19 might be omitted and an impervious section with a sharp defining edge be formed upon the head of the bag by coating it with P & B paint or other impervious paint, along the line of the upper edge of the groove 34 as at 175.

It will be seen that the construction described provides for the carrying and correct alining of the filter members in the filter frame, the proper alining and spacing of the filter frames or leaves in respect to each other, and ready means for taking to pieces or assembling the filter leaves which, together with the frames of the filter, may be readily taken to pieces and packed on muleback or in any other conveniently small and light packages for transportation when desirable. To facilitate this the joints between the uprights 10 and the horizontals 11 and 13 are preferably secured by non-corrosive screws or in other convenient detachable manner.

Without attempting to enumerate any other of the many modifications of which the invention is susceptible, I claim the following:

1. A filter having a filter frame comprising upright supports and lower and upper transverse supports, a plurality of separable and detachable forms mounted on the supports, and filtering septa upon said forms.

2. A filter having a filter frame comprising upright supports and lower and uper transverse supports, a plurality of separable and detachable forms mounted on the supports, and filtering septa upon said forms, said supports having eduction passageways communicating with said forms and septa.

3. A filter having a filter frame comprising upright supports and lower and upper transverse supports, a plurality of separable and detachable forms mounted on the supports, and filtering septa upon said forms, said supports having eduction passageways for the filtrate.

4. A filter having a filter frame comprising upright supports and lower and upper transverse supports, a plurality of separable and detachable forms mounted on the supports, and filtering septa upon said forms, said supports and said forms both having communicating passageways for fluid.

5. A filter having a filter frame comprising upright suports and lower and upper transverse supports, a plurality of separable and detachable forms mounted on the supports, and filtering septa upon said forms substantially inclosing the forms severally, and ducts in communication with the interiors of said septa.

6. A filter leaf comprising a frame and a plurality of filtering units composing a substantially uninterrupted panel and severally and detachably secured to the frame.

7. A filter leaf comprising a frame and a plurality of filtering units composing a panel and means for securing the units in the panels comprising at least one grooved member for receiving and holding one portion of each unit and at least one movable guide bar.

8. A filter leaf comprising a frame and a plurality of filtering units composing a panel and means for securing the units in the panels comprising at least one grooved member for receiving and holding one portion of each unit and at least one movable guide bar, said frame having spacing members for spacing it in respect to similar frames, and projecting means for supporting the frame in a tank.

9. A filter leaf comprising a frame and a plurality of filtering units having separate septa composing a panel and carried by the frame, said frame having means for loosely spacing it in respect to similar frames.

10. A filter leaf comprising a frame and a plurality of filtering units composing a substantially uninterrupted panel, said units consisting of a plurality of detachable parts and said units being separably secured to the frame.

11. A filter leaf comprising a frame and a plurality of filtering units composing a substantially uninterrupted panel, and conducting connections severally and separably connected with the respective filtering units.

12. A movable filter leaf comprising one or more panels each comprising a plurality of filtering units detachably held together.

13. A movable filter leaf comprising one or more panels, each comprising a plurality of filtering units provided with separate conducting connections, and a common pipe or duct for the said connections, forming a part of the said filter leaf.

14. A filter having a frame comprising upright and horizontal members, one of the horizontal members having a channel or groove for receiving one or more filter units, two guide bars for holding one or more filter units between them, and fluid-conducting connections, in combination with the one or more filter units.

15. A filter having a frame comprising upright and horizontal members, one of the horizontal members having a channel or groove for receiving one or more filter units, two guide bars for holding one or more filter units between them, and fluid-conducting connections, in combination with the one or more filter units, each comprising an interior form and a filtering septum.

16. A filter having a frame comprising upright and horizontal members, one of the horizontal members having a channel or groove for receiving one or more filter units, two guide bars for holding one or more filter units between them, and fluid-conducting connections, in combination with the one or more filter units, each comprising a filtering form having a tongue for the said channel or groove, and a filtering septum.

17. A filter having a frame comprising upright and horizontal members, one of the horizontal members having a channel or groove for receiving one or more filter units, two guide bars for holding one or more filter units between them, and fluid-conducting connections, in combination with the one or more filter units, each comprising a form carrying a filtering septum and having channels in communication with said conducting connections.

18. A filter having a composite panel combining a plurality of units having a plurality of filtering septa for receiving a united layer of precipitate.

19. A filter having a composite filtering panel comprising a plurality of separable filtering septa constituting a joint septum for holding a layer or cake of precipitate.

20. A filter having a composite filtering panel comprising a plurality of separable filtering septa constituting a joint septum for holding a layer or cake of precipitate, and means for communicating suction or pressure simultaneously to the separate septa.

21. A filter having a composite filtering panel comprising a plurality of separable filtering septa constituting a joint septum for holding a layer or cake of precipitate and supported from its filtrate side against collapse and also against substantial inflation by reversed pressures.

22. In a filter, a plurality of separate expansible forms inclosed in filtering septa, means for carrying and holding the same side by side, and a common fluid connection in communication with the separate forms and septa.

23. In a filter, a plurality of separate expansible forms inclosed in filtering septa, and means for carrying and holding the same side by side, comprising detachable means for releasing them.

24. In a filter, a tubular septum, having an interior expansible and collapsible form.

25. In a filter, a tubular septum having an interior expansible and collapsible form with channels lengthwise of the tube and a cross channel and an educting connection in communication with the said cross channel.

26. In a filter, a tubular septum, having an interior form comprising means for stretching the septum.

27. In a filter, a tubular septum, having an interior form, an eduction pipe extending into the interior of the septum but loose from the form, and means for confining the septum about the said pipe.

28. In a filter, a tubular septum having an interior form comprising wedging means for facilitating a tight fit between septum and form.

29. In a filter, a tubular septum having an interior form comprising a plurality of relatively movable pieces fitted together along lines oblique to the edges of the form.

30. A filter or filter unit, having a filter bag, an interior support therefor, supports external to the bag for both holding the interior support in place and definitely limiting the cake formation upon it, and fluid connections for the interior of the bag.

31. A filter or filter unit, having a filter bag, an interior support therefor, supports external to the bag for both holding the unit and definitely limiting the cake formation upon it, comprising one or more movable members by means of which the said unit is releasable from the supports.

32. A filter or filter unit, having a filter bag, an interior support therefor, supports external to the bag for both holding the unit and definitely limiting the cake formation upon it, comprising a pivoted bar and a clamp for the same for securing or releasing the unit.

33. A filter or filter unit, comprising a septum, and a form for carrying it, embodying means for stretching it while upon the form.

34. A filter or filter unit comprising a septum, a carrying form, and a pipe loose from said form and secured to said septum in combination with mechanical external supports for said unit acting against the septum and form and means for mounting the said supports and the said pipe holding said form and septum in fixed relation to said pipe.

In testimony whereof I have signed this specification in the presence of two subscribing witnesses this 28th day of August 1908.

CLARENCE G. PATTERSON.

Witnesses:
W. E. F. DEAL,
M. MUSTEDT.